3,366,483
CHILLPROOFING FERMENTED MALT BEVERAGES WITH EXTRACTS OF THE GROWTH PRODUCTS OF MOLD MICROORGANISMS

Irwin M. Stone, Staten Island, N.Y., assignor to Baxter Laboratories, Inc., Morton Grove, Ill., a corporation of Delaware
No Drawing. Continuation-in-part of application Ser. No 476,724, Aug. 2, 1965. This application Sept. 26, 1966, Ser. No. 581,709
7 Claims. (Cl. 99—48)

ABSTRACT OF THE DISCLOSURE

Chillproofing of fermented malt beverages, for example, beer, with extracts of the water soluble growth products of mold microorganisms, for example, *Aspergillus niger, A. awamori, A. usami, A. phoenicius, A. alliaceous, A. foetidus, A. flavus A. miyakoensis, A. luchuensis*, and *Penicillium funiculosum*.

---

This is a continuation-in-part of co-pending application Ser. No. 476,724, filed Aug. 2, 1965, now abandoned. Application Ser. No. 476,724 is a continuation-in-part of application Ser. No. 278,477, filed May 6, 1963, now abandoned.

This invention relates to the art of chillproofing fermented malt beverages. More particularly, the present invention relates to the production and utilization of extracts with chillproofing properties from mold sources.

Fermented malt beverages such as beers and ales or the like (referred to as "beers" hereinafter) are produced by the fermentation with yeast of the sugary extracts or worts obtained from mashes of barley malt and grains. After fermentation, the beers so obtained are carried through various operations such as cold storage, maturing, carbonation, filtration, etc., in order to obtain the sparkling clear, carbonated, foamy beverage ready for packaging. During these brewery operations the beer is subjected to a processing step known in the trade as "chillproofing."

Chillproofing is the step in the art of brewing that produces a beer that will remain sparkling clear and brilliant when subjected to low temperatures, as occur, for example, during conventional refrigeration, even for long periods of time. The successful chillprofing of beer began over 50 years ago with the introduction of the use of proteolytic enzymes for this purpose. This process still in worldwide use by the brewing industry, and the preponderance of beer produced in this country is now enzymatically chillproofed with proteolytic enzymes.

The use of proteolytic enzymes for chillproofing is based on the concept that the haze or turbidity which forms in beer is wholly or in part a consequence of the presence of high molecular weight, protein-like compounds that tend to become insoluble when the temperature is lowered. The proteolytic enzymes are believed to act upon these high molecular weight protein compounds and split them into more readily soluble, lower molecular weight materials which have less tendency to precipitate by combining with anthocyanogens and with tannin-like bodies to form hazes and turbidities at low temperatures.

Other methods of chillproofing are known in the brewing art such as the adsorption and removal of the chillhaze substances on materials such as bentonite, nylon or other specific polymers. Basic type polymeric absorbents, e.g., nylon and insoluble polyvinyl pyrrolidone which have the property of removing the polyphenolic beer constituents such as the anthocyanogens or tannins, are also effective in chillproofing beer. The chillhaze substance of beer is generally regarded as a colloidal precipitate of an insoluble protein-tannin-like body. Therefore, beer can be effectively chillproofed by either attacking the protein moiety of beer with proteolytic enzymes or by removing the anthocyanogens by adsorptive or precipitant means. The formation of filterable precipitates by the action of polyvinyl pyrrolidone or polyvinyl methyl oxazolidinone on chillhaze substances has also been suggested as a method of chillproofing beer. None of these methods have been commercially successful in this country; the beer produced in this country is now essentially all chillproofed by proteolytic enzymatic means, although adsorbents and precipitants are employed to chillproof beer in certain foreign countries.

Economic considerations are largely responsible for the lack of success of non-enzymatic chillproofing processes in this country because of the increased numbers of processing operations and materials handling steps required for their successful application. Furthermore, these non-enzymatic techniques lack the simplicity and convenience of enzymatic processes.

The most extensively utilized enzyme for chillproofing beer worldwide is papain, which is the proteolytic enzyme system derived from the *Carica papaya* plant. Papain is usually sold to the brewer in a specifically purified and standardized form. The brewery adds a specified amount of the standardized chillproofing enzyme preparation to a known volume of beer (e.g. 1 pound of chillproofing enzyme per 100 barrels of beer) while the beer is being moved from tank to tank during its routine processing in the brewery. The beer is resistant to chillhaze formation on subsequent processing and storage under reduced temperature conditions.

While papain has successfully chillproofed untold millions of barrels of beer, it is not the theoretically ideal chillprofing material. Deleterious factors, such as oxidation and the presence of traces of metals, may adversely affect the shelf life of beers not only because of well-known reactions with beer constituents to produce unstable compounds causing hazes and sediments, but also because of inactivation of the enzymes surviving in the finished packaged product. The inactivating action of the oxygen and metals on the enzymes may not be direct but through the intermediate action on certain oxidizable compounds present in the beer. These compounds may form complexes or chelates with the trace metals which readily become highly oxidized to form oxygen donors which then react with and inactivate the enzymes. In mechanisms of this type, in which a trace metal is complexed or chelated by naturally occurring organic materials, the resulting complex on chelate actively catalyzes oxidation or other types of reactions. Such reactions are common in biological systems. During the course of the oxidation such complexes also may become insoluble and contribute to the formation of hazes and turbidities.

It has now been discovered that a heretofore unrecognized chillproofing system is present in certain extracts obtained from the growth of certain fungal microorganisms, e.g., molds. This system effectively chillproofs beers in an efficient and superior manner. Unlike beers chillproofed by the customarily employed proteolytic enzymes and enzyme systems, the beers chillproofed by these mold extracts surprisingly are relatively unaffected by air and oxidation and are not sensitive to the presence of traces of metals such as copper, iron, nickel or tin.

The mold extracts of this invention have been found useful for the chillproofing of fermented malt beverages contain a variety of different types of enzymes such as pectinases, cellulases, hemicellulases, amylases, proteases and other enzyme systems. Surprisingly, however, while these extracts do contain proteases, the proteolytic activity of the exracts is much lower than that required for chillproofing. Thus, if these extracts are assayed for proteolytic activity by the tests customarily used for assaying the activity of the proteolytic types of chillproofing enzyme, such as by digestion of casein, or by a conventional milk clotting test, the results will show a very low order of activity. The amount of proteolytic activity contained in the mold extracts of this invention may be only one-fortieth of that required for effective chillproofing by a commercial papain-type proteolytic chillproofing enzyme preparation. Let, such extracts will effectively chillproof beer.

Also, there appears to be no positive correlation between the activity of the non-proteolytic enzyme systems mentioned above and chillproofing effect. Particularly, the usual proteolytic enzyme assays and the determination of anthocyanogens, which are the two methods in general use to determine potential chillproofing effect, are of no predictive value. These mold extracts have no substantial protein digesting powers, and the beers treated with the extracts have the same anthocyanogen or tannin contents as the untreated beers. Therefore, if these fungal extracts are assayed by the commonly used anthocyanogen or enzyme activity tests, a completely erroneous conclusion is reached as to their effectiveness as chillproofing agents.

Since the conventional chillproof tests are ineffective for identifying the mold extracts utilized in this invention, it has been necessary to develop or adopt a totally different test procedure, namely, a test procedure which correlates with the actual chillproofing activity of the extracts. Such a test is the Increment Chillproofing Test (or I.C.T.). This test, which measures the actual chillproofing activity of the mold extracts of this invention, is described in detail as follows: Fermented, but unchillproofed beer,, so-called "ruh beer," is stored cold at 30° F. in closed containers, protected from exposure to air for about three weeks. At the end of the storage period, the beer is filtered to sparkling clarity at this low temperature, and it is then carbonated. This carbonated beer is flowed into colorless 12 ounce bottles and is foamed-over to remove air from the bottle head space. The bottle is then sealed with a crown cap. About twenty to twenty-four bottles of this freshly bottled beer are used for each test. One half of the bottles are treated with incremental additions of a standard, known chillproofing enzyme, and the other half are used for the sample under test. The standard employed in the tests described herein is the proteolytic enzyme, papain, of a known activity. The cold standard bottles are opened, and aliquots of a solution of the standard chillproofing formulation containing a known quantity of the papain are added in amounts to give increments in the range of from about 5 to 30 parts per million of the formulation. After addition of the aliquots of the standard chillproofing formulation, the bottles are tapped to create a foam and are immediately sealed with a crown cap when the rising foam reaches the crown surface. A similar set of bottles is prepared with added increments of the mold extract test sample, by adding suitable aliquots of the test sample under the same conditions employed for the standard. The contents of the standard and test bottles are well mixed by inversion and are then pasteurized by raising the temperature to 60° C. in twenty minutes, by holding at 60° C. for ten minutes, and by then cooling to room temperature in about twenty minutes. These bottles are then stored at 30° C. for one week. After storage, the bottles are placed in a 0° C. circulating bath for about 20 hours. The bottles are removed one by one from this cold bath, and the amount of chillhaze formed is determined, either by visual comparison with turbidity standards contained in similarly sized and shaped bottles or by nephelometric measurement in an instrument such as the Radiometer. After measurement of the haze and recording of the results, the bottles are returned to storage at 30° C. for another week. They are again re-iced under the same conditions and the chillhaze again measured. The storage and icing cycle is repeated weekly for three weeks. Typical results are shown in Table I, which gives the data on the particular "ruh" beer employed with the papain containing chillproofing standard and a test sample of a concentrate of an extract obtained from the metabolic aerobic growth products of *Aspergillus niger*. The higher the numerical value of the chillhaze, the more turbid is the beer.

It will be seen in the chillhaze data for the Standard Chillproofing Enzyme that the addition of 22 p.p.m. (the optimum level) produces a beer that remains clear throughout the test period. Increasing the amount of standard has no further improving effect over the 3 week period. Reducing the amount of standard enzyme added produces beers with varying degrees of chillhaze. The less of the standard enzyme that is added, below the optimum level, the more unstable is the resulting beer sample. This test demonstrates that an adequately chillproofed beer, under the conditions of the test, is produced by adding about 22 p.p.m. of the standard enzyme. By correlating similar chill-haze readings obtained on beers containing increments of the unknown test sample, a quantitative measure of the chillproofing activity of the unknown sample may be obtained. This quantitative ratio is the Increment Chillproofing Test Value, or I.C.T. value, which relates the chillproofing activity of an unknown sample in terms of a standard. If the test sample does not provide low chillhaze readings of the order of those provided by the standard (see Table II), the test sample does not have a positive I.C.T. value and, consequently, has no chillproofing effect.

The quantitative relationship between the chillproofing activity of the standard and the test sample is shown by the typical test data for an *A. niger* extract, as reported in Table I. For this particular extract of the metabolic growth products of *A. niger*, a level of 40 p.p.m. is sufficient to provide good chillproofing effect. Increasing the amount used does not effectively produce any increased chillproofing effect. Beers treated with less than 40 p.p.m. of the niger extract, as was the case with similar beers containing the standard chillproofing material of sub-optimal levels, show increasing instability as the treatment levels are decreased. The chillhaze values of the sample at the various increments are correlated with the chillhaze values of the standard, and the ratios of p.p.m. quantities of the sample and standard are obtained. For example, in the first week's data 14 p.p.m. of the standard is required to obtain a chillhaze value of 4, and 30 p.p.m. of the *A. niger* extract is required. Therefore, a ratio of about 0.5 results from dividing 14 by 30. A series of these ratios is calculated using the other comparable data of the test, and the average of these ratios is expressed as the I.C.T. value. The I.C.T. is, therefore, an expression of the degree of chillproofing activity of the test sample when compared with the standard.

An I.C.T. cannot be assigned to a mold extract sample which has no chillproofing properties, because there are no comparable low chillhaze values to form a basis for calculating these I.C.T. ratios.

A significant and surprising difference exists between the proteolytic enzyme (papain) type of chillproofing and the chillproofing effect demonstrated by the mold extracts of this invention, as is evident from the data of Table I. At levels below the optimum for the chillproofing effect, the use of standard proteolytic chillproofing enzyme results in a gradual reduction in chillproofing capacity over a period of time, at a given level of enzyme usage, whereas the chillproofing capacity of the mold extract surprisingly increases with time. This significantly important difference is borne out in larger tests simulating brewery operations, such as in a pilot brewery test. If a proteolytic enzyme-chillproofed beer is hazy immediately after filtration, it will remain hazy and will not become clear on subsequent storage. However, even though a beer chillproofed by the enzyme systems contained in the mold extracts of this invention may not be perfectly clear after filtration, it will tend to clear up and become brilliant with the passage of time. This tendency of the beer to clear up, with the passage of time, is another definite advantage for the mold extracts of this invention in the commercial production of chillproofed beer. If for some reason in brewery operations, the beer effluents from the filters are not as sparkingly brilliant as they should be, the chillproofing compositions of this invention will remove this haze from the beer on standing and thus correct the operational insufficiencies of the brewery. This safety factor is not present with proteolytic enzyme chillproofed beer.

The following examples will serve to illustrate this invention with greater particularity.

Example I

A wheat bran mash is prepared from wheat bran, wheat flour and water, and is sterilized. One hundred twenty-five grams of the sterile mash, contained in a Fernbach flask, is inoculated with an actively growing culture of *Aspergillus niger*. After suitable growth for about five days at 30° C., the resultant bran-growth product is dried at low temperature until ready for extraction. Ten parts by weight of water is then mixed with the bran and stirred or shaken continually for a period of an hour. The liquor is expressed from the wet bran by pressing (centrifugation or filtration may also be used). The liquor thus obtained may be used in the chillproofing of beer or preferably may be concentrated by low temperature evaporation to give a more active material which will give chillproofing effects at much lower levels of addition to beer. The concentrates so prepared give results similar to those illustrated in Table I. If the non-concentrated aqueous extract of the bran-growth product (1 part bran to 10 parts water), instead of the concentrate, is employed directly in the testing procedure reported in Table I, the amounts used will have to be increased. Instead of being measured in parts per million, the illustrated scale of values will be in pounds per 100 to about 300 barrels of beer.

Example II

A mold growth product on a wheat bran mash is made under conditions similar to those given in Example I, except that an actively growing culture of *Aspergillus awamori* is used instead of *A. niger*. The aqueous extract or the concentrate of the aqueous extract of these metabolic growth substances, made under the above described conditions, likewise exhibits chillproofing properties when tested under the conditions of the Increment Chillproofing Test and under practical conditions in a brewery.

Example III

Three hundred pounds of the sterile wheat bran mash described in Example I above is inoculated with an actively growing culture of *Aspergillus usami*. The inoculated bran is contained on sterile trays in thin layers, the depth of which are not greater than one inch. The organism is grown at 30° C. for about five days. The bran is then extracted with five parts by weight of water to remove the soluble metabolic growth products which result from the growth of the microorganisms. The aqueous extract thus obtained is separated from the insolubles and is then concentrated by vacuum evaporation at about 30° C. The concentrate obtained shows excellent chillproofing effects in the Increment Chillproofing Test and produces a superior chillproofed beer under actual brewery operating conditions.

Example IV

The procedure of Example III is repeated except that the bran is inoculated with *Aspergillus phoenicius* instead of the organism used in the aforesaid example. The product obtained gives substantially the same results as in Example III.

Other specific examples of mold microorganisms which were treated according to the procedure of Example III and gave substantial chillproofing effects in the Increment Chillproofing Test are *Aspergillus alliaceous, A. foetidus, A. flavus, A. miyakoensis, A. luchuensis,* and *Penicillium funiculosum*.

The aqueous extracts obtained in the above examples may be further treated, if desired, to inactivate the limit dextrinase contained therein by adjusting the pH of the extracts to about 1.5 to about 2 for several hours. The pH is then readjusted upward to its original value of about 5. This inactivating of the limit dextrinases prevents the breakdown of the dextrins normally found in beer into fermentable sugars. The sweet taste which results in the beer from these fermentable sugars is generally considered undesirable. The downward pH adjustment, followed by an upward readjustment, has no adverse affect on the chillproofing properties of the mold extracts of this invention.

A concentrated dry, partially purified chillproofing material can be prepared from the above filtered aqueous extracts by fractional precipitation and drying as follows: The filtered extracts of the soluble metabolic growth products of the mold organisms are concentrated by low temperature vacuum evaporation to a specific gravity of approximately 12° Baumé. The chillproofing materials are precipitated from this concentrated liquor by adding and dissolving therein a salt, such as ammonium sulfate, to give a salt concentration of about 25 percent to 33 percent by weight. This mixture is allowed to stand to allow the precipitate to form and settle. Some filter aid may be added and the precipitate is either centrifuged or filtered off to obtain a relatively dry cake. This cake is then redissolved in about 1.5 parts by weight of water at about 25° C. and the pH is adjusted from its original value of 4.5 to 5.0 to pH 1.8 with hydrochloric acid. The pH is held at this value for about one hour at this temperature and is then readjusted back to its original pH value with sodium hydroxide solution. This liquor is then refiltered and the clear filtrate is dried by low-temperature vacuum drying or by spray drying or freeze-drying to give a friable powder. This dried material generally has about 15 times the chillproofing effect of the 12° Bé concentrated liquor or about 60 to 90 times the activity of the original extracts.

It will be seen from the above examples that extracts of the metabolic growth products of *Aspergillus niger, A. awamori, A. usami, A. phoenicius, A. alliaceous, A. foetidus, A. flavus, A. miyakoensis, A. luchuensis,* and *Penicillium funiculosum* show definite chillproofing effect when measured by the above-described Increment Chillproofing Test. That is, these extracts have positive I.C.T. values. On the other hand, fungal organisms such as *Aspergillus oryzae, A. wentii, Mucor delemar, Amylomyces rouxii, Penicillium oxalicum, P. casei, P. janthinellum, P. raistrickii, Byssachlamys fulva, Fusarium moniforme, Rhizopus arrhizus, Thamnidium elegans, Myrothecium verrucaria,* Trichodderma sp., *Gliocladium roseum,* and *Schlerotina fructicola,* when grown under the same conditions, produce extracts which show no chillproofing effects when measured by this test. These organisms yield extracts lacking in chillproofing capacity and hence are designated as having negative I.C.T. values. This term "negative" is not intended in a mathematical sense to represent negative number but to indicate absence of chillproofing effect. The term "positive" is used to indicate the presence of chillproofing effect as indicated by the I.C.T. results.

A positive chillproofing effect can be seen by inspection of the I.C.T. results as tabulated in Table I. In the series of chillhaze results set forth in this tabulation, the values of the chillhaze measurements tend to become lower with increasing increments of enzyme and mold extract until an optimum effect is realized, thus showing a "positive" chillproofing effect. In contradistinction, the chillhaze values in Table II quite clearly show no essential lowering of the chillhaze in the beers treated with mold extract, even when the mold extract is employed at levels up to 2000 ppm. This is typical of materials with no chillproofing activity. Such materials have "negative" I.C.T. values.

The increment chillproofing test can be used not only to measure quantitatively the chillproofing effect of the exact of certain organisms, but also for screening to determine which organisms can qualitatively be used to produce suitable chillproofing effects. The test serves as a criterion and standard for chillproofing effect and efficiency. It is particularly advantageous in the chillproofing effect can be determined for a complex mixture of naturally occurring substances without the need to first fractionate the system and identify the constituents of the system. Even if the chillproofing effect is attributable to unknown, non-ezymatic constituents in such a system, the effect can still be detected and determined.

In the commercial application of present chillproofing enzymes in the brewing process, a solution of the enzyme is prepared and is added to the beer at some point after fermentation. It is usually added while the beer is being move from tank to tank in the brewery cellar, so that the convection currents produced in the moving beer will effect complete dispersion and thorough mixing of the added chillproofing composition.

The chillproofing extracts of the present invention may be used in the same manner. No change, therefore, is required in the current procedures customarily followed in present day brewery practice.

While it is preferred to add these new chillproofing materials to the fermented beer as it is placed into storage, which is a procedure more in accordance with present day chillproofing practice, no technical reason precludes the addition at a stage earlier in the process. Under some particular brewery conditions, more efficient utilization of the mold growth product systems of this invention may be made if they are added to the wort before or during fermentation. Thus, they may be added before, at the start of or during the course of the fermentation, or a first portion of the extract may be added to the fermenter and a second portion added later. The use of the extracts of this invention in the chillproofing process is quite flexible and permits many processing variations. Concentrates of these mold growth extracts have been found effective for chillproofing at levels of one to two pounds per 100 barrels of beer.

It has also been found that it is possible to combine the chillproofing extracts of the present invention with the proteolytic enzymes now used for this purpose such as papain, ficin, pinguinain or bromelain. The admixture of these mold chillproofing extracts and plant proteolytic enzymes results in a synergistic effect, in that a much lesser quantity of either material is required in the mixture to obtain a given level of chillproofing. Since the two materials seem to function by entirely different methodologies, the observed effect is true synergism and is not merely additive. In addition, the use of these mold chillproofing extracts in combination with the customarily employed plant proteolytic chillproofing enzymes imparts the significant new advantage of increased resistance to the deleterious effects of air and oxidation. The presence of these mold extracts also confers protection against the adverse effects attributable to traces of metals such as iron, copper, nickel and tin.

Examples illustrative of these mixtures are as follows.

Example V

The major portion of the beer produced in the United States is now chillproofed with the plant enzyme, papain. Papain, as used by the brewing industry, is employed in the form of a standardized chillproofing product containing a known amount of enzyme of known activity. This permits the use of a definite amount of the chillproofing product per unit barrelage of beer (such as 1 pound of product per 100 barrels of beer).

When employing a combination of papain and the mold extracts of this invention, it is possible to achieve a given chillproofing level using only about ⅓ to ½ of the amount of both the papain and the extract as would have been required if each were used as the sole chillproofing agent. The combined action of the papain proteolytic enzymes and the mold growth products of this invention thus provides at these lower levels of treatment a chillproofing effect which is superior to that of either when used alone, even at the normal levels of treatment. This combination of chillproofing ingredients may be added to the beer in the customary manner and the beer may be satisfactorily processed using the routinely employed brewery processing practices.

Example VI

Proteolytic enzymes other than papain may be used in the chillproofing procedure. Ficin, the proteolytic enzyme obtained from the latex of trees of the genus Ficus, has chillproofing properties. Ficin is usually obtained commercially as a bulky, cream colored, acrid powder which is a dried concentrate obtained from the latex. Its proteolytic activity can be highly variable, but about 10 to 20 parts per million of a fresh, good active concentrate are required to give a chillproof beer, when used in place of the papain enzyme described in Example V. Ficin may also be combined with the fungal growth products of this invention to give an improved combination. The components of this mixture are used at levels below that required for the individual ingredients when used as the sole chillproofing agent.

Example VII

Bromelain, the enzyme from plants of the pineapple family, has been suggested for use in the chillproofing beer. About 25 parts per million of a fresh active preparation will chillproof beer. As with the use of other proteolytic enzymes mentioned in the previous examples, the effectiveness of bromelain as a chillproofing agent is increased by combination with the fungal growth products of this invention. Superior results are obtained from such a combination product at ingredient concentrations far lower than are required to chillproof beer when the components are used separately.

All the examples provided in this specification are for the purposes of illustration only. Many changes may be made in the proportions, organisms, concentrations, other proteolytic enzymes or mixtures, ratios, strengths or other conditions by those skilled in the art without departing from the spirit and scope of the appended claims.

TABLE I.—TYPICAL TEST DATA FOR THE INCREMENT CHILLPROOFING TEST (I.C.T.) ON AN ORGANISM (*A. NIGER*) SHOWING "POSITIVE" I.C.T. VALUES

| Amount of Chillproofing Added, p.p.m. | Chillhaze Measurements [1] | | |
|---|---|---|---|
| | 1 Week | 2 Weeks | 3 Weeks |
| Standard Chillproofing Enzyme: | | | |
| 8 | 8 | 12 | 14 |
| 10 | 6 | 10 | 12 |
| 12 | 5 | 5 | 8 |
| 14 | 4 | 4 | 5 |
| 16 | 3 | 3 | 3 |
| 18 | 2 | 2 | 2 |
| 20 | 1 | 2 | 2 |
| 22 | 1 | 1 | 2 |
| 24 | 1 | 1 | 2 |
| 26 | 1 | 1 | 2 |
| Concentrate of *A. niger* Extract: | | | |
| 5 | 14 | 16 | 16 |
| 10 | 12 | 10 | 8 |
| 15 | 10 | 8 | 5 |
| 20 | 7 | 6 | 2 |
| 30 | 4 | 2 | 1 |
| 40 | 2 | 1 | 1 |
| 60 | 1 | 1 | 1 |
| 80 | 1 | 1 | 1 |

[1] Turbidity as number of milligrams of 200 mesh kaolin per 12 ounces.
NOTE.—Increment Chillproofing Test Value (I.C.T.)=about 0.5.

TABLE II.—TYPICAL TEST DATA FOR THE INCREMENT CHILLPROOFING TEST (I.C.T.) ON AN ORGANISM (A. ORYZAE) SHOWING "NEGATIVE" I.C.T. VALUES

| Amount of Chillproofing Added, p.p.m. | Chillhaze Measurements [1] | | |
|---|---|---|---|
| | 1 Week | 2 Weeks | 3 Weeks |
| Standard Chillproofing Enzyme: | | | |
| 8 | 7 | 9 | 17 |
| 10 | 5 | 8 | 13 |
| 12 | 2 | 4 | 7 |
| 14 | 2 | 3 | 6 |
| 16 | 0.5 | 1 | 6 |
| 18 | 0.5 | 0.5 | 4 |
| 20 | 0.5 | 0.5 | 4 |
| 22 | 0.5 | 0.5 | 3 |
| 24 | 0.5 | 0.5 | 3 |
| 26 | 0.5 | 0.5 | 2 |
| Concentrate of A. oryzae Extract: | | | |
| 400 | 9 | 17 | 20+ |
| 480 | 9 | 17 | 20+ |
| 640 | 8 | 17 | 20+ |
| 720 | 8 | 17 | 20+ |
| 800 | 8 | 17 | 20+ |
| 880 | 8 | 17 | 20+ |
| 960 | 8 | 17 | 20+ |
| 1,200 | 8 | 17 | 20+ |
| 1,600 | 8 | 17 | 20+ |
| 2,000 | 8 | 17 | 20+ |

[1] Turbidity as number of milligrams of 200 mesh kaolin per 12 ounces.
NOTE.—Increment Chillproofing Test Value (I.C.T.)=nil.

I claim:

1. The method of chillproofing fermented malt beverages which comprises adding to said beverages a composition selected from the group consisting of extracts and concentrates of the extracts of the water soluble growth products of mold microorganisms selected from the group consisting of Aspergillus niger, A. awamori, A. usami, A. phoenicius, A. alliaceous, A. foetidus, A. flavus, A. miyakoensis, A. luchuensis, and Penicillium funiculosum, said composition having a positive I.C.T. value, having a proteolytic activity which is less than that normally considered as effective for the chillproofing of malt beverages, and being free of Limit Dextrinase activity.

2. The method of claim 1 in which the mold microorganism is Aspergillus niger.

3. The method of claim 1 in which the mold microorganism is A. awamori.

4. The method of claim 1 in which the mold microorganism is A. usami.

5. The method of claim 1 in which the mold microorganism is A. phoenicius.

6. A composition for the chillproofing of fermented malt beverages which comprises an extract of the water soluble growth product of mold microorganisms selected from the group consisting of Aspergillus niger, A. awamori, A. usami, A. phoenicius, A. alliaceous, A. foetidus, A. flavus, A. miyakoensis, A. luchuensis, and Penicillium funiculosum, which extract has a positive I.C.T. value, has a proteolytic activity which is less than that normally considered as being effective for the chillproofing of malt beverages and is free of Limit Dextrinase activity.

7. The composition of claim 6 in combination with a proteolytic enzyme of plant origin.

References Cited

UNITED STATES PATENTS

| 2,077,449 | 4/1937 | Wallerstein | 99—48 |
| 2,848,371 | 8/1958 | Yoshida | 195—62 |
| 3,055,757 | 9/1962 | Segel | 99—31 |

A. LOUIS MONACELL, Primary Examiner.

D. M. NAFF, Assistant Examiner.